United States Patent [19]

Hase

[11] Patent Number: 4,661,898
[45] Date of Patent: Apr. 28, 1987

[54] PRECISION CONSTANT CURRENT CONTROL WITH AUTOMATIC COMPENSATION

[76] Inventor: Alfred M. Hase, 6 Manorwood Road, Scarborough, Ontario, Canada, M1P 4G7

[21] Appl. No.: 724,873

[22] Filed: Apr. 19, 1985

[51] Int. Cl.⁴ .............................................. H02M 7/00
[52] U.S. Cl. ....................................... 363/82; 320/39; 320/48; 363/91; 363/125
[58] Field of Search ....................... 363/52, 82, 84, 90, 363/91, 125; 320/39, 40, 48

[56] References Cited

U.S. PATENT DOCUMENTS 3,087,107 4/1963 Hunter et al. ........................... 363/82
4,320,333 3/1982 Hase ....................................... 320/48

Primary Examiner—Patrick R. Salce
Assistant Examiner—Anita M. Ault
Attorney, Agent, or Firm—Donald E. Hewson

[57] ABSTRACT

A circuit is provided having an alternating current input and a synchronous switch means which has a control coil—such as a saturable reactor—with the input, so as to control the energy throughput of the synchronous switch means and therefore the output of the circuit. The current through the control coil is sensed and maintained in such a manner that the ampere-turns ratio of the control coil is maintained constant, thereby ensuring that the output of the circuit will be at a constant current irrespective of the internal resistance of the control coil or changes of that resistance. The output of the circuit may be an alternating current; more generally, it would be a direct current for such use as a battery forming and charging circuit.

13 Claims, 3 Drawing Figures

PRECISION CONSTANT CURRENT CONTROL WITH AUTOMATIC COMPENSATION

FIELD OF THE INVENTION

This invention relates to circuits having constant current outputs, both alternating and direct current, and particularly relates to such constant current output circuits as are controlled by controlling the current through a control coil of a synchronous switch means at the alternating current input of the circuit.

BACKGROUND OF THE INVENTION

There are many circumstances when the output of a circuit which drives its input energy from an alternating current source is desired to be a constant current. Such circuits may, for example, be connected to loads that are sensitive as to current change, more usually they may be connected to loads such as heater controls for oven heaters where it is desired that the temperature or heat input to the oven be maintained at a constant level; and when the output current is a direct current, the circuits of the present invention are useful for such circuits as battery chargers, and particularly for battery forming and charging circuits.

When a circuit has a direct current output and is being used to form and charge batteries— such use being generally by the manufacturer of the batteries—it is particularly desired that the output current be maintained at a constant level. Without a constant output current, the manufacturer cannot be fully satisfied that a predetermined amount of energy has been delivered to the batteries that are being formed. In any event, there are many circumstances where a constant current is desirable so as to ensure that the rate of energy flow to a load is controlled.

However, when a load is connected whose load characteristics may change in time, such as a number of batteries that are connected in series to be formed— they may be connected in parallel, but for purposes of load discontinuity sensing as discussed hereafter, series connected batteries are better—the current flowing through a control coil which controls the synchronous switch means by which the rate of energy throughput is controlled, may increase. Moreover, as a control coil heats up while it is in use, due to the current that is flowing through it, the copper wire from which the control coil is generally formed may experience an increase in resistance. Thus, the resistance characteristic of a control coil may not always remain constant. depending on whether the coil is cool, warm or hot, and that may be determined by the length of time that the coil has been in operation.

According to the present invention, the current flowing through the control coil is sensed, and adjustments are made to maintain that current at a predetermined constant valve. By maintaining the current at a constant level, since the number of turns on the coil are not going to change, the ampere-turns ratio of the control coil remains constant. Also, by maintaining the current through the control coil at a constant level, the output current from the circuit whose energy throughput is controlled by the synchronous switch means under the influence of the control coil, is also maintained at a constant level. Otherwise, if the resistance of the control coil goes up as the coil warms up, and efforts are made only to maintain the voltage drop across the control coil at a constant level, then the current through the control coil will reduce and therefore the output of the circuit will reduce.

Moreover, by controlling the current through the control coil of the synchronous switch means so as to maintain that current at a constant level, thereby controlling and maintaining the output current of the circuit at a constant level, that constant current output may be maintained at that predetermined constant level without regard to the nature of the load or line conditions—once the predetermined level has been set. Still further, sensing the current through the control coil is within a loop which is internally of the circuit, rather than at the output of the circuit. Therefore, the present invention provides a circuit whereby there is precision control of the output of the circuit. If the sensing by which the control coil current is controlled were at the output of the circuit, the sensing and thus the control could be a function of an outside failure.

As discussed hereafter and with reference to the accompanying figures, which illustrate several alternative preferred embodiments of the present invention, the control of current through the control coil is by way of an output from a constant current sensing and output adjusting circuit to a regulator for the control coil. That regulator may be one which is intrinsically fail safe by being connected in shunt relation to the control coil, or the regulator may be in series with the control coil. Because solid state components may fail to a closed condition, if such failure occurs a substantially direct short circuit develops. If the device is across the control coil, then the coil is substantially shorted out, and the current through it will reduce to zero thereby reducing the output of the synchronous switch which is controlled by the control coil to zero. If the regulator is in series, and the solid state regulator fails, then severe current stress on the control coil may occur, and the output of the circuit will go high rather than low.

When a circuit according to the present invention is provided with an input rectifier and is connected to a plurality of batteries as a battery forming and charging circuit—and, indeed, in other circumstances when the circuit may be connected to a resistive load such as a heater load—it may be desirable for there to be a soft walk-in circuit whereby, when the load is first connected, there are no high inrush currents to the circuit. One such soft walk-in circuit is discussed hereafter, and may provide a walk-in of about 10 cycles, which at 60 Hz is 100 msec. Thus, the output current from the circuit may be allowed to gradually increase to the predetermined constant level.

There may also be a discontinuity alarm sensing circuit in the output of a circuit according to the present invention, and it functions to provide a control signal to reduce the current through the control coil to zero. Thus, if a discontinuity between the output of the circuit and the load, or within the load occurs, such as when a battery that is being formed fails open—such discontinuity will be sensed and the current through the control coil will be reduced to zero to avoid stressing the circuit whose output has reduced already to substantially zero because of the discontinuity.

It is usual, however, to provide current limiting means in series with the control coil, so that the current through the control coil and series current limiting means will only rise to a particular maximum value.

If the output of a circuit according to the present invention is an alternating current circuit, then usually an auxiliary direct current power supply will be provided for the control current sensing and output adjusting circuits, and other solids state circuits, that form part of the invention or are installed in constant current output devices that embody the circuits of the present invention.

BRIEF DESCRIPTION OF THE DRAWINGS

There will now follow a discussion of the features of the present invention that have been discussed above, and which are set forth in the accompanying claims, which description is made in association with the accompanying figures showing features and principles of the present invention in lesser or greater detail, as follows:

DESCRIPTION OF THE PREFERRED EMBODIMENTS

Figure 1:
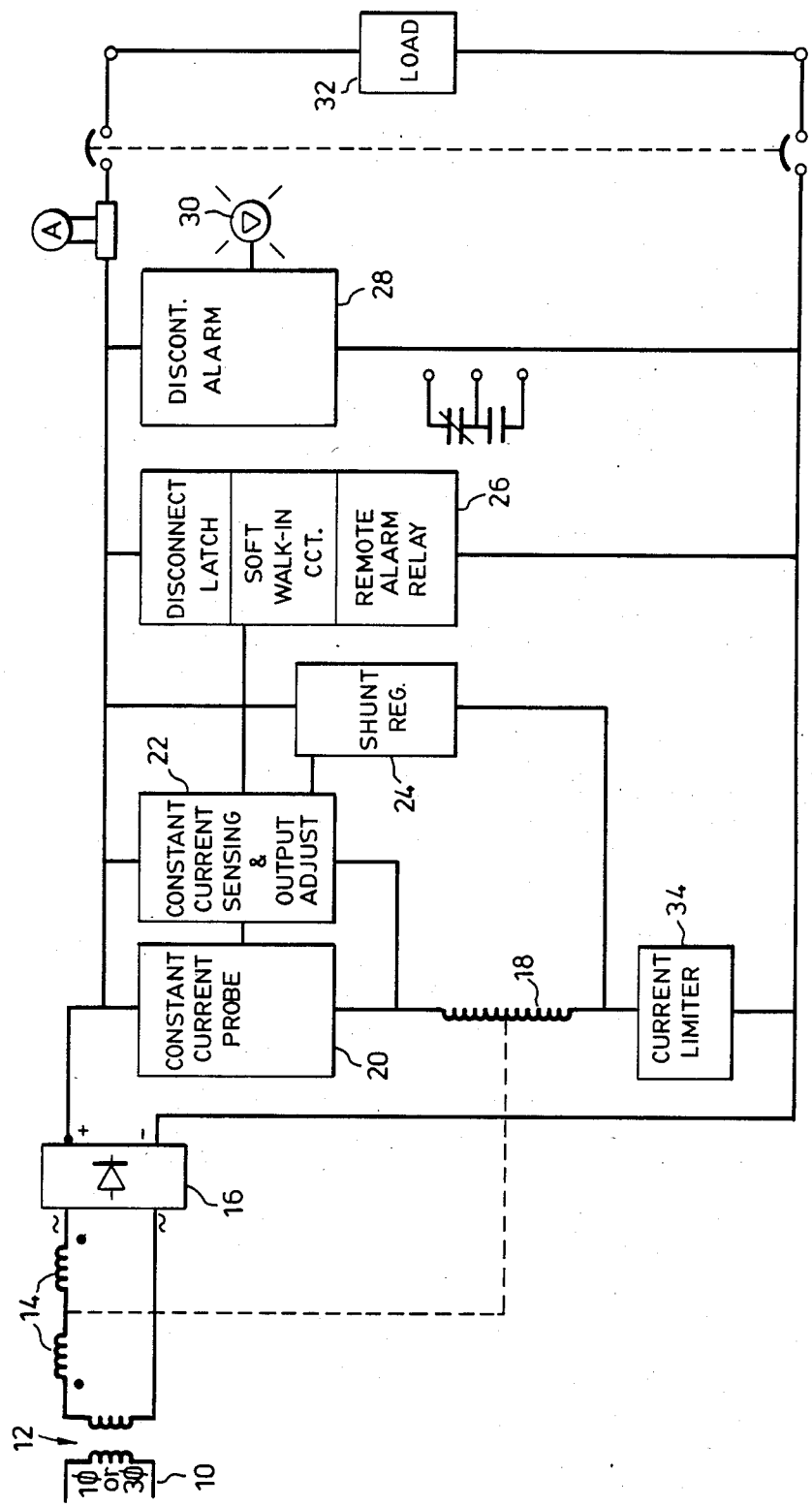
FIG. 1 is a simple block circuit diagram of a constant current battery forming and charging circuit according to the present invention, having intrinsic fail-safe shunt regulation of the control coil.

FIG. 1 shows a precision constant current battery forming and charging circuit that has intrinsic fail-safe shunt control of the saturable reactor. The circuit has an input at 10—which may be either single phase, three phase or otherwise, alternating current at an appropriate voltage—and, after an isolating transformer 12 (not absolutely necessary) there is a saturable reactor that has a gate coil 14 which may be wound as a pair of coils in series as shown, or in parallel. Because the output of the circuit of FIG. 1 is intended to be direct current, a rectifier 16 is shown.

The saturable reactor 14 is one of a number of different kinds of synchronous switch means, which may also include magnetic amplifiers, silicon controlled rectifiers, and the like. In any event, the saturable reactor or synchronous switch means 14 has a control coil 18 whose purpose is to control the conducting period of the synchronous switch, and thereby to control the energy throughput of the synchronous switch and thereby of the circuit.

The current through the control coil 18 is sensed and controlled by a constant current probe 20 which is in series with the control coil 18, and the output of the constant current probe is fed to a constant current sensing and output adjusting circuit 22. The output of the constant current sensing and output adjusting circuit 22 goes to a shunt regulator 24 in FIG. 1 (or a series regulator in FIG. 2 as discussed hereafter) whereby the amount of current that flows through the control coil 18 is maintained at a constant level. To the extent that the invention has been described thus far, it is seen that the output current of the circuit may be maintained at a pre-determined constant level irrespective of the internal resistance characteristic of the control coil, or changes of that resistance characteristic.

A disconnect latch, soft walk-in circuit, and remote alarm relay module 26 is provided, to serve several purposes. The disconnect latch will disconnect the output of the circuit when no load is connected to it, so as to ensure the operation of the soft walk-in circuit when a new load is connected. The relay portion of module 26 will provide power for a remote alarm relay in the event of inadvertent disconnection of the circuit.

The discontinuity alarm 28 functions to provide an alarm such as by way of a flashing light 30 if a discontinuity within the load 32, or of the load 32 from the output terminals of the circuit, is sensed.

As discussed above, the load 32 may be a string of batteries which are connected in series. When batteries which are to be formed are connected in series—battery forming being an operation by which the battery receives its initial charge after it has first been assembled—likelihood is that any failure of such newly manufactured batteries that are being formed will be failure by way of an open circuit, or indeed it may be failure by way of a poor connection within the battery itself, or to the battery. In any event, when the batteries are connected in series, any such failure results in a discontinuity and therefore the output of the circuit will reduce to zero. If the batteries were connected in parallel and one battery failed open, then too much current may be fed to the remaining batteries because the output of the circuit remains constant into a lower load.

A current limiting resistor 34 is in series with the control coil 18, for the purposes discussed above.

Figure 2:
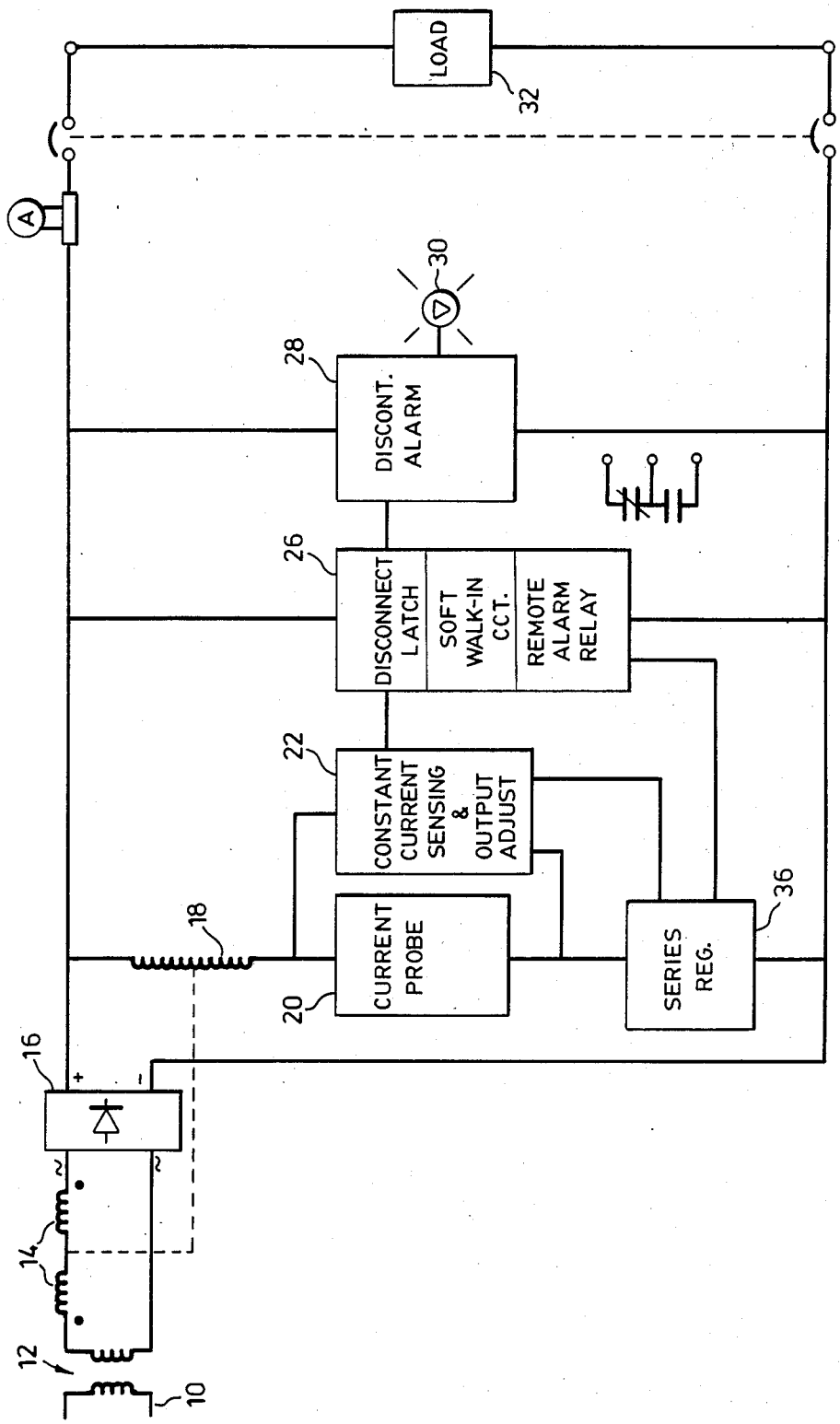
FIG. 2 is a circuit similar to FIG. 1 but having series regulation of the control coil.

Referring to FIG. 2, that figure essentially duplicates all of FIG. 1, except that a series regulator 36 is placed in the circuit, in series with the current probe 20 and the control coil 18. In general, the series regulator module 36 will also serve the purpose of a current limiting means.

Figure 3:
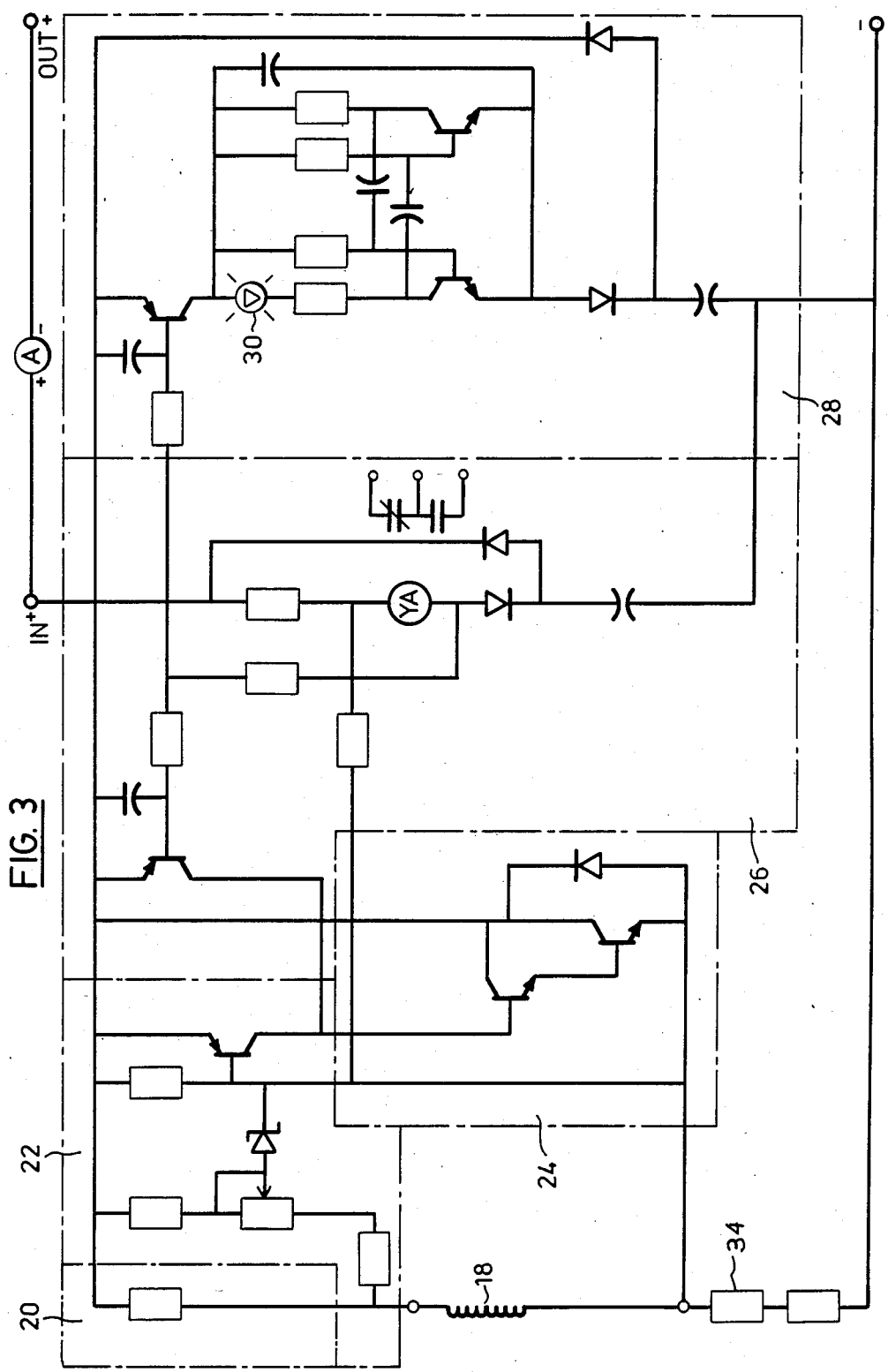
FIG. 3 is a typical circuit showing portions of the circuit of FIG. 1 in general detail with respect to some of the electronic components that are used.

With references to FIG. 3, the control coil 18; the constant current probe 20; the constant current sensing and output adjustment circuit 22; the shunt regulator circuit 24; the disconnect latch, soft walk-in circuit, and remote alarm relay module 26; and the discontinuity alarm circuit 28 and flashing light 30 are all illustrated. In this preferred embodiment, the shunt regulator circuit may comprise a Darlington pair, or it may comprise a single transistor, or other device as appropriate. Likewise, the zener diode in the constant current sensing and output adjustment module 22 could be replaced, for example, by a microchip or other device having the necessary voltage reference sensing characteristic.

It will be appreciated that sensing and maintaining the current through the control coil 18 at a constant level assures that the output current will remain constant, because the principal of equal ampere-turns ratio of the control coil governs the control mode of the saturable coil reactor or other synchronous switch means 14.

Likewise, it is appreciated that sensing of the control coil current provides for automatic correction for the temperature co-efficient of resistance of the copper wire of the control coil, thereby assuring precision regulated constant current output regardless of the internal temperature of the coil or the temperature of the ambient within which the circuit or at least the control coil is working.

By providing the soft walk-in circuit, especially when a battery load is to be connected to the circuit, arcing of the connector clips against the battery terminals is precluded when the last connection is made. The provision of the discontinuity alarm merely assures that immediate corrective action will be taken as soon as an open circuit fault of the load occurs.

The above discussion has related to a circuit which provides constant output current, (either alternating current or direct current as desired and as the circuit is designed), with precision so that the output constant current at a predetermined level may be assured. Sensing of the current through the control coil, and adjusting it so as to maintain a constant ampere-turns ratio of the control coil, assures the constant output current; and as such sensing is within the circuit itself it is therefore independent of any external conditions. Sensing is thereby not a function of an outside failure.

The scope of the present invention is defined by the appended claims.

What is claimed is:

1. A circuit having an alternating current input, a synchronous switch means in series with the input and having a control coil to control the energy throughput of said synchronous switch means;
    characterized in that the output of said circuit is at a predetermined constant current level to a load;
    wherein the rate of alternating current input through said synchronous switch means is controlled by said control coil, and where the current through said control coil is sensed and controlled so as to maintain the ampere-turns ratio of said control coil at a constant value;
    whereby said output current to a load is maintained at said predetermined constant current level irrespective of the internal resistance characteristic of said control coil, or changes of said resistance characteristics;
    and wherein current through said control coil is sensed by way of a current probe in series with said control coil, the output of said current probe being fed to a constant current sensing and output adjusting circuit whose output controls a regulator for said control coil, whereby the amount of current flowing through said control coil may be maintained constant.

2. The circuit fo claim 1, where said controlled constant current output current is an alternating current.

3. The circuit of claim 2, where regulation of the current in said control coil is by means of a shunt regulator means connected in parallel with said control coil.

4. The circuit of claim 2, where regulation of the current in said control coil is by means of a series regulator means connected in series with said control coil.

5. The circuit of claim 1, further comprising rectifier means at said input with said synchronous switch means, whereby said controlled constant current output current is a direct current.

6. The circuit of claim 5, where regulation of the current in said control coil is by means of a shunt regulator means connected in parallel with said control coil.

7. The circuit of claim 6, as a battery charger connected to a load of at least one battery.

8. The circuit of claim 6, as a battery forming and charging circuit connected to a load of at least one battery.

9. The circuit of claim 5, where regulation of the current in said control coil is by means of a series regulator means connected in series with said control coil.

10. The circuit of claim 5, where said constant current sensing and output adjusting circuit is initially controlled by a disconnect latch and soft walk-in circuit; whereby when said load is first connected to the output of said circuit, the output current gradually increases to said predetermined constant level.

11. The circuit of claim 1, where there is a discontinuity alarm sensing the output of said circuit; so that if a discontinuity between the output of the circuit and the load or within the load is sensed and the output current reduces to zero, then the current through said control coil will be reduced to zero.

12. The circuit of claim 1, where current limiting means is in series with said control coil.

13. A circuit having an alternating current input, a synchronous switch means in series with the input and having a control coil to control the energy throughput of said synchronous switch means;
    characterized in that the output of said circuit is at a predetermined constant current level to a load;
    wherein the rate of alternating current input through said synchronous switch means is controlled by said control coil, and where the current through said control coil is sensed and controlled so as to maintain the ampere-turns ratio of said control coil at a constant value;
    whereby said output current to a load is maintained at said predetermined constant current level irrespective of the internal resistance characteristic of said control coil, or changes of said resistance characteristics;
    wherein current through said control coil is sensed by way of a current probe in series with said control coil, the output of said current probe being fed to a constant current sensing and output adjusting circuit whose output controls a regulator for said control coil, whereby the amount of current flowing through said control coil may be maintained constant;
    and wherein said constant current sensing and output adjusting circuit is initially controlled by a disconnect latch and soft walk-in circuit; whereby when said load is first connected to the output of said circuit, the output current gradually increases to said predetermined constant level.

* * * * *